(12) United States Patent
Summerlin (10) Patent No.: US 8,960,150 B2
(45) Date of Patent: Feb. 24, 2015

(54) PISTON ARRANGEMENT AND ENGINE
(71) Applicant: Milladale Limited, Berkshire (GB)
(72) Inventor: Frederick A. Summerlin, Berkshire (GB)
(73) Assignee: Milladale Limited, Berkshire (GB)
( * ) Notice: Subject to any disclaimer, the term of this patent is extended or adjusted under 35 U.S.C. 154(b) by 0 days.
(21) Appl. No.: 14/347,408
(22) PCT Filed: Jul. 12, 2013
(86) PCT No.: PCT/GB2013/051859
§ 371 (c)(1),
(2) Date: Mar. 26, 2014
(87) PCT Pub. No.: WO2014/009745
PCT Pub. Date: Jan. 16, 2014
(65) Prior Publication Data
US 2014/0209052 A1    Jul. 31, 2014
(30) Foreign Application Priority Data

Jul. 12, 2012  (GB) .................................. 1212449.1

(51) Int. Cl.
*F16C 7/02*    (2006.01)
*F02F 3/00*    (2006.01)
(Continued)
(52) U.S. Cl.
CPC ............... *F02F 3/0015* (2013.01); *F16C 7/023* (2013.01); *F02B 75/021* (2013.01); *F01B 9/02* (2013.01); *F02B 75/32* (2013.01); *F02B 41/06* (2013.01)
USPC ...................................................... 123/197.3
(58) Field of Classification Search
CPC ........ F02B 75/06; F02B 75/065; F02B 75/32; F02B 75/02; F02B 75/021; F16C 7/00; F16C 7/02; F16C 7/023
USPC .................. 123/197.3, 193.4, 193.6
See application file for complete search history.

(56) References Cited

U.S. PATENT DOCUMENTS 367,496 A    8/1887  Atkinson
(Continued)

FOREIGN PATENT DOCUMENTS

DE    10 2010 049513    4/2012
(Continued)

OTHER PUBLICATIONS

International Search Report for Application No. PCT/GB2013/051859 mailed Oct. 28, 2013.

*Primary Examiner* — Lindsay Low
*Assistant Examiner* — Jacob Amick
(74) *Attorney, Agent, or Firm* — Warner Norcross & Judd LLP (57) ABSTRACT

A piston arrangement comprising a piston movable within a cylinder and having a stroke with a first end and a second end, wherein the piston is coupled to a crankshaft by a linkage mechanism including a toggle link which is pivotally coupled to the piston and pivotally coupled to a con-rod, wherein the toggle link has a first position corresponding to the first end of the piston stroke, a second position different to the first position also corresponding to the first end of the piston stroke, and an intermediate position between the first and second positions corresponding to the second end of the piston stroke such that the piston completes four strokes for every one revolution of the crankshaft. Also a piston arrangement comprising first and second pistons movable respectively within first and second cylinders, wherein the first piston is coupled to a crank shaft by a first linkage mechanism including a first toggle link pivotally connected to the first piston and pivotally connected to a first con-rod, wherein the second piston is coupled to the crank shaft by a second linkage mechanism including a second toggle link pivotally connected to the second piston and pivotally connected to a second con-rod, wherein the first and second con-rods have different lengths such that the first and second pistons operate out of phase with each other. Also an engine comprising at least two high pressure pistons movable within respective high pressure cylinders and at least one low pressure piston movable within a low pressure cylinder, wherein the low pressure piston moves through twice the number of strokes moved through by each of the high pressure pistons in the same period of time, wherein a linkage mechanism coupling the low pressure piston to a crankshaft includes a toggle link.

14 Claims, 7 Drawing Sheets

(51) Int. Cl.
*F02B 75/02* (2006.01)
*F01B 9/02* (2006.01)
*F02B 75/32* (2006.01)
*F02B 41/06* (2006.01)

(56) References Cited

U.S. PATENT DOCUMENTS

| | | |
|---|---|---|
| 1,755,942 A | 4/1924 | Woolson |
| 6,227,161 B1 * | 5/2001 | Urushiyama .............. 123/197.4 |
| 2009/0223482 A1 * | 9/2009 | Schmitz ..................... 123/311 |
| 2010/0180868 A1 * | 7/2010 | Scalzo ........................ 123/48 B |
| 2012/0180752 A1 * | 7/2012 | Heimanns .................. 123/197.3 |

FOREIGN PATENT DOCUMENTS

| | | |
|---|---|---|
| GB | 294110 | * 11/1928 |
| GB | 705 780 | 3/1952 |
| WO | 90/15917 | 12/1990 |

* cited by examiner

PISTON ARRANGEMENT AND ENGINE

FIELD OF THE INVENTION

The invention relates to a piston arrangement and to an engine.

BACKGROUND OF THE INVENTION

In some piston systems it is desirable to operate two pistons coupled to a common drive mechanism at different speeds. This is typically achieved by linking two different crankshafts together by a geared drive mechanism which runs the camshafts at different speeds such that two pistons may be driven at different speeds by the respective camshafts. This arrangement is, however, comparatively heavy and complex, and requires provision of an entirely separate crankshaft, leading to difficulties in providing a compact engine arrangement. It is therefore desirable to provide a piston system which overcomes these disadvantages.

SUMMARY OF THE INVENTION

A first aspect of the invention provides a piston arrangement comprising a piston movable within a cylinder and having a stroke with a first end and a second end, wherein the piston is coupled to a crankshaft by a linkage mechanism including a toggle link which is pivotally coupled to the piston and pivotally coupled to a con-rod, wherein the toggle link has a first position corresponding to the first end of the piston stroke, a second position different to the first position also corresponding to the first end of the piston stroke, and an intermediate position between the first and second positions corresponding to the second end of the piston stroke such that the piston completes four strokes for every one revolution of the crankshaft.

The piston arrangement allows the piston to complete four strokes for every revolution of the crankshaft, thereby doubling the piston speed compared to a traditional linear to rotary power transfer assembly. It is therefore possible to run the piston at twice the speed of one or more other pistons coupled to the same crankshaft without the need for a second crankshaft running at a different speed.

A linkage mechanism is defined as a system comprising one or more linkage elements connecting at least two components and adapted to control relative motion of the at least two components, for example by constraining the components to move in a particular way or along a particular path and/or by transmitting a force to cause relative motion between the components. A toggle link is defined as a linkage member connected to at least two other elements within a linkage mechanism which pivots or "toggles" between at least two different positions to operate the linkage mechanism. A toggle mechanism is defined as an actuation mechanism comprising one or more toggle links. A con-rod is defined as a linkage element which is attached to a crankshaft and which converts rotary motion of the crankshaft to linear motion of a distal end of the con-rod or vice-versa.

The con-rod connects the toggle link to the crankshaft. There may or may not be other intermediate components between the con-rod and the toggle link or crankshaft, for example a further toggle link or con-rod. Similarly the toggle link may or may not be connected directly to the piston. For example the toggle link may be connected to the piston by a piston rod and/or a lever mechanism with or without mechanical advantage. A lever mechanism with mechanical advantage may be used to increase the length of the stroke of the piston without increasing the size of the toggle link.

The toggle link may move from the first position to the second position via the intermediate position and back to the first position during a single complete revolution of the crankshaft. The first and second positions may be spaced apart on opposite sides of the intermediate position. The first and second positions may each correspond to toggled or knuckled positions while the intermediate position may correspond to a straight or extended position. The toggle link may pass through the same intermediate position as it returns from the second position to the first position. The path of the toggle link from the second position back to the first position may be the inverse of the path followed from the first position to the second position.

The first end of the piston stroke may be a bottom-dead-centre position (eg maximum cylinder volume position). Alternatively the first end of the piston stroke may be a top-dead-centre position.

The piston may move along a first axis, and the toggle link may be coupled to the con-rod at a pivot point which moves along a second axis substantially transverse to the first axis. The pivot point may be constrained to move along the second axis, for example by a swinging arm (resulting in a slightly curved movement path) or a shuttle block (resulting in substantially linear movement).

The piston arrangement may further include a second piston coupled to the crankshaft by a linkage mechanism similar to that of the first piston.

A common con-rod may be shared by the first and second pistons, and the first and second pistons may have separate toggle links both coupled to the common con-rod. The toggle links may share a common mounting point or pivot point. The first and second pistons may oppose each other and may help to balance each other to reduce vibration.

A second aspect of the invention provides a piston arrangement comprising first and second pistons movable respectively within first and second cylinders, wherein the first piston is coupled to a crank shaft by a first linkage mechanism including a first toggle link pivotally connected to the first piston and pivotally connected to a first con-rod, wherein the second piston is coupled to the crank shaft by a second linkage mechanism including a second toggle link pivotally connected to the second piston and pivotally connected to a second con-rod, wherein the first and second con-rods have different lengths such that the first and second pistons operate out of phase with each other.

The first and second pistons may operate 180 degrees out of phase with each other.

The first piston may have a stroke with a first end and a second end, and the first toggle link may have a toggled position corresponding to the first end of the piston stroke and an extended position corresponding to the second end of the piston stroke.

The second piston may have a stroke with a first end and a second end, and the second toggle link may have a toggled position corresponding to the first end of the piston stroke of the second piston and an extended position corresponding to the second end of the piston stroke of the second piston.

The toggled positions of the first and second toggle links may be spaced apart on opposite sides of a centreline or axis of at least one of the first and second pistons.

The first con-rod may be coupled to a first crank-pin and the second con-rod may be coupled to a second crank-pin. The first and second crank-pins may have shaft axes substantially in the same plane. The first and second crank-pins may be substantially co-axial.

The first and second con-rods may differ in length by approximately twice the eccentricity of the first and second crank-pins with respect to the crankshaft.

The piston arrangements of the first and/or second aspects may be included in an internal combustion engine. Alternatively these piston arrangements may be used in any other linear/rotary power conversion system, for example in a pump or other engine.

One possible application of the piston arrangements of the first and second aspects of the invention is in a class of compound heat engine which in its simplest form comprises two high pressure cylinders and one low pressure cylinder the piston of which moves through twice the number of strokes moved through by the piston of either high pressure cylinder in the same period of time. In its basic form the engine comprises two high pressure cylinders with pistons in antiphase and one low pressure cylinder the piston of which runs at twice the speed of the high pressure pistons.

A third aspect of the invention provides an engine comprising at least two high pressure pistons movable within respective high pressure cylinders and at least one low pressure piston movable within a low pressure cylinder, wherein the low pressure piston moves through twice the number of strokes moved through by each of the high pressure pistons in the same period of time, wherein a linkage mechanism coupling the low pressure piston to a crankshaft includes a toggle link.

By coupling the low pressure piston to the crankshaft using a toggle actuated linkage mechanism such that the low pressure piston operates at twice the speed of the high pressure pistons, the low pressure piston is capable of assisting both high pressure pistons with their intake, compression, power and exhaust strokes while running from the same crankshaft.

The toggle link may be pivotally connected to the low pressure piston and pivotally connected to a first connecting rod. The con-rod connects the toggle link to the crankshaft. There may or may not be other intermediate components between the con-rod and the toggle link or crankshaft, for example a further toggle link or con-rod. Similarly the toggle link may or may not be connected directly to the piston. For example the toggle link may be connected to the low pressure piston by a piston rod and/or a lever mechanism with or without mechanical advantage.

The toggle link may be adapted to move from a toggled position in a first direction to a toggled position in a second direction opposite to the first direction and back again for every one revolution of the crankshaft. The toggle link may move through an intermediate position in between its two extended positions. The toggled positions may correspond to a bottom dead centre position of the low pressure piston and the intermediate position may correspond to a top dead centre position of the low pressure piston. Alternatively the toggled positions may correspond to a top dead centre position and the intermediate position may correspond to a bottom dead centre position.

The high pressure pistons may be coupled to the crankshaft by linkage mechanisms including toggle links. The toggle links of the high pressure pistons may be pivotally connected to the high pressure pistons and pivotally connected to respective second and third connecting rods. There may or may not be other intermediate components between the second and third con-rods and the toggle links of the high pressure pistons or the crankshaft, for example further toggle links or con-rods. Similarly the toggle links of the high pressure pistons may or may not be connected directly to the high pressure pistons. For example the toggle links may be connected to the high pressure pistons by piston rods and/or lever mechanisms with or without mechanical advantage. Alternatively the high pressure pistons may be coupled to the crankshaft by a more conventional crankshaft and con-rod arrangement where the con-rod has a small end attached to the piston.

The second and third connecting rods may have different lengths such that the first and second high pressure pistons operate 180 degrees out of phase with each other. The second and third connecting rods may differ in length from the each other by approximately twice the radius of the cranks at the points of connection to the second and third connecting rods.

The toggle links associated with the high pressure cylinders may be adapted to move between an extended condition and a toggled condition and back again for every one revolution of the crankshaft. The toggles associated with the high pressure cylinders may be substantially straight or extended when the high pressure pistons are at top dead centre and knuckled or toggled when the high pressure pistons are at bottom dead centre.

The first, second and third connecting rods may be coupled to respective first, second and third crank-pins of the crankshaft having shaft axes which are substantially in the same plane. The first crank pin may be located on an opposite side of the crankshaft to the second and third crank pins.

The first crank pin hay have approximately twice the eccentricity of the second and third crank pins.

The engine may further include an additional engine unit comprising third and fourth high pressure cylinders and a second low pressure cylinder.

The third and fourth high pressure cylinders and second low pressure cylinder may be arranged on the opposite side of the crankshaft to the first and second high pressure cylinders and the first low pressure cylinder. The third and fourth high pressure cylinders may oppose the first and second high pressure cylinders, and the second low pressure cylinder may oppose the first low pressure cylinder. The third and fourth high pressure cylinders may be arranged substantially co-axially to the first and second high pressure cylinders, and the second low pressure cylinder may be arranged substantially co-axially to the first low pressure cylinder. This layout is advantageous because it helps to achieve dynamic balance and reduce engine vibration.

The engine may be a two-stroke or a four-stroke engine and may operate by spark ignition, direct injection or compression ignition. Operation of a two-stroke engine having two high pressure pistons and one low pressure piston moving at twice the speed of the high pressure pistons is described in UK patent 294110. Operation of a four-stroke version will be discussed in detail with reference to the drawings in the following detailed embodiment.

A plurality of engine units according to the third aspect of the invention integrated together to form a larger engine.

One or more features of any one of the aspects of the invention may be combined with one or more aspects of any other embodiment of the invention. In particular, the engine of the third aspect may operate the low pressure piston according to the first aspect and the high pressure pistons according to the second aspect.

In a preferred embodiment of the engine of the third aspect of the invention, in operation expansion or suction strokes are initiated in a high pressure cylinder at top dead centre (i.e. minimum volume) and at approximately half stroke when the low pressure cylinder is at top dead centre a transfer valve opens and the stroke is completed with the high and low pressure cylinders interconnected. Similarly for compression or exhaust strokes this is started in both high and low pressure cylinders at bottom dead centre (i.e. maximum volume), but when the low pressure cylinder reaches top dead centre the transfer valve closes and the stroke is completed in the high pressure cylinder only.

Thus for the lower part of each stroke of a high pressure piston high and low pressure cylinders are interconnected so that effectively the displacement of the engine is greatly increased, the low pressure cylinder working with one or other of the high pressure cylinders in turn.

The result of this is that for the initial part of the expansion stroke the rate of increase in cylinder volume is greatly reduced providing an effective increase in the time available for combustion and virtual elimination of time loss. In addition the torque characteristic is smoothed out producing improvements in engine handling. Also since combustion takes place in the smaller high pressure cylinder a similar shaped combustion chamber to a conventional engine is obtained with greatly reduced stroke resulting in very low piston speeds and low friction.

In one embodiment there are provide two low pressure cylinders, the axes of which are co-incident and in which the relevant pistons are driven to move equal distances in an opposite direction to each other and in which the remaining volumes of the two cylinders are equal. There are also provided four high pressure cylinders arranged in pairs and disposed either side of the low pressure cylinders in which the axes of each pair of high pressure cylinders are co-incident with each other and parallel to the axes of the low pressure cylinders and in which the pistons of each pair are constrained to move in an opposite direction to each other so that the remaining volumes of the two cylinders are equal and in which the pistons of one pair of cylinders are in antiphase with the pistons of the other pair of cylinders and in which, in any time period, the low pressure pistons move through twice the number of strokes of the high pressure pistons, and in which the linkages connecting the pistons to the crankshaft include at least one toggle mechanism.

The pistons drive a crankshaft having three co-planar cranks in which the crank which is driven by the low pressure pistons has twice the eccentricity of the other two cranks and in which the cranks with the smaller eccentricity are in the same plane and 180 degrees out of phase to the crank with the longer eccentricity, and the pistons drive the crankshaft through a connecting rod and lever system characterised by a toggle mechanism associated with each pair of pistons in which the toggles associated with the high pressure pistons move from a knuckled position to a straight position whereas the toggle associated with the low pressure pistons moves from a knuckled position on one side of the straight position to a knuckled position on the other side of the straight position such that for each revolution of the crankshaft the high pressure pistons perform one inward and one outward strokes whereas the low pressure pistons perform two inward and two outward strokes. It is further preferably arranged that when the first pair of high pressure pistons are at top dead centre the associated toggle is knuckled but the toggle associated with the second pair of high pressure pistons is substantially straight and the pistons are at bottom dead centre.

The linkage connecting the pistons to the crankshaft preferably comprise a system of linkages and levers which apart from the contact between pistons and cylinders have only substantially rotary motions and avoid any linear sliding elements.

It is also preferable that when the high pressure pistons are at bottom dead centre their respective toggles are substantially straight.

BRIEF DESCRIPTION OF THE DRAWINGS

Embodiments of the engine will now be described by way of example and with reference to the accompanying drawings in which.

DETAILED DESCRIPTION OF EMBODIMENTS

Figure 1:
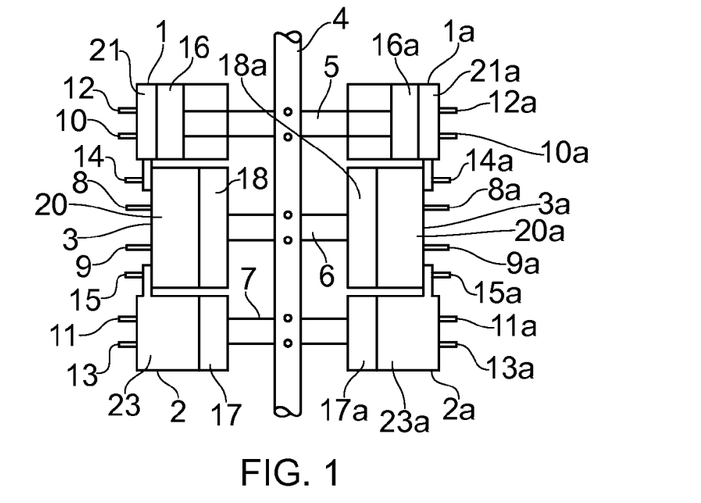
FIG. 1 shows diagrammatically how the high and low pressure cylinders are arranged relative to each other.

FIG. 1 shows two basic engine units, each comprising two high pressure pistons and one low pressure piston, which have been integrated together. Thus high pressure cylinders 1 and 2 cooperate with low pressure cylinder 3 to form a first basic engine and cylinders 1a, 2a and 3a form the second basic engine. The combined engine comprises a first pair of high pressure cylinders 1 and 1a the pistons of which are connected to a crank of the crankshaft 4 by linkage mechanism 5. Cylinders 1 and 1a are parallel and adjacent to the low pressure cylinders 3 and 3a whose pistons are connected to the crankshaft by linkage mechanism 6. On the opposite side of the low pressure cylinders a second pair of high pressure cylinders 2 and 2a is located connected to the crankshaft by linkage mechanism 7.

Crankshaft 4 carries 3 cranks, one for each pair of pistons, all in the same plane. The cranks that are driven by the high pressure pistons have half the eccentricity of the crank driven by the low pressure piston and are 180 degrees out of phase with the cranks driven by the low pressure cylinder.

Each high pressure cylinder has an inlet valve 10, 10a, 11 and 11a and an exhaust valve 12, 12a, 13 and 13a. In addition, each of the low pressure cylinders has two transfer valves 14, 14a, 15 and 15a linking the low pressure pistons to the high pressure pistons. The low pressure cylinders 3 and 3a may in addition have inlet valves 8 and 8a and exhaust valves 9 and 9a. These valves are all operated by camshafts in a conventional manner.

The operation of cylinders 1, 2 and 3 will be described in detail, but operation of cylinders 1a, 2a and 3a is identical apart from differences in valve phasing which ensure that power strokes in cylinders 1, 2 and 3 do not occur simultaneously in cylinders 1a, 2a and 3a. In FIG. 1 the low pressure piston 18 is at bottom dead centre, i.e. space 20 is at maximum volume, piston 16 is at top dead centre, i.e. space 21 is at minimum volume and piston 17 at bottom dead centre and space 23 is also at maximum volume. In cylinder 1 inlet valve 10 and exhaust valve 12 are both shut and expansion is about to begin. Transfer valve 14 is closed. In cylinder 2 inlet valve 11 and exhaust valve 13 are both closed and transfer valve 15 is open. Compression is taking place in cylinders 2 and 3 which are interconnected. Expansion continues in cylinder 1 until low pressure piston 18 is at top dead centre when transfer valve 15 closes and transfer valve 14 opens. Expansion continues in cylinders 1 and 3 which are now connected together and compression continues in cylinder 2 only. When piston 16 in cylinder 1 and piston 18 in cylinder 3 both reach bottom dead centre valve 12 in cylinder 1 and valve 9 in cylinder 3 open and the exhaust stroke takes place. Piston 17 has now reached top dead centre and ignition followed by expansion occurs. When piston 18 reaches top dead centre transfer valve 14 and exhaust valve 9 close and exhaust continues in cylinder 1 only. Meanwhile expansion has been taking place in cylinder 2 and at top dead centre of piston 18 transfer valve 15 opens and expansion is completed in both cylinders 2 and 3. Exhaust valves 9 and 13 now open and the exhaust stroke takes place in cylinders 2 and 3. Suction is now taking place in cylinder 1 with inlet valve 10 open. When the low pressure piston 18 reaches top dead centre transfer valve 14 and inlet valve 8 open and suction is completed in both cylinders 1 and 3. At the same time transfer valve 15 closes and the exhaust stroke is completed in cylinder 2. Compression now takes place in cylinders 1 and 3 with both valves 10 and 11 closed until top dead centre of piston 18 when transfer valve 14 closes and compression is completed in cylinder 1. Simultaneously suction is initiated in cylinder 2 to be completed in cylinders 2 and 3 as previously described. This completes one complete cycle for this half of the engine.

The operation of cylinders 1a, 2a and 3a is similar to the operation of cylinders 1, 2 and 3 except that the compression and expansion strokes in these cylinders are arranged to take place when suction and exhaust strokes occur in cylinders 1, 2 and 3. Thus four power strokes equally spaced are produced for each revolution of crankshaft 4.

The operation of the linkage 6 driven by the low pressure pistons will now be described with reference to FIGS. 2a, 2b, 2c and 2d, which are a diagrammatic representation of linkages to enable the principles to be explained.

Figure 2A:
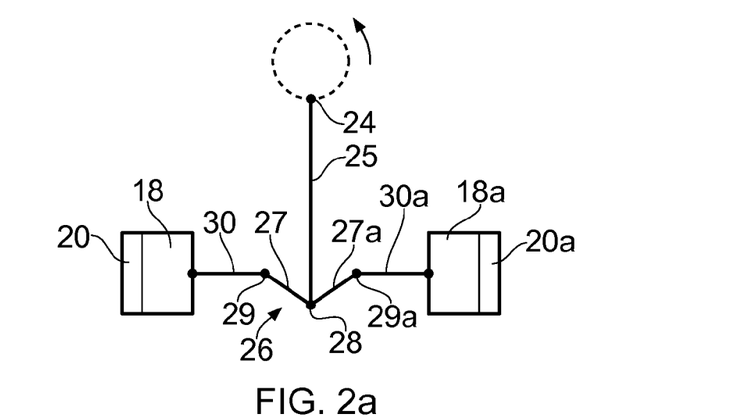
FIGS. 2a, 2b, 2c and 2d show diagrammatically the operation of the linkage that drives the crankshaft from the low pressure pistons, FIGS. 3a and 3b similarly show the linkage that drives the crankshaft from one pair of the high pressure pistons, FIGS. 4a and 4b similarly show the linkage that drives the crankshaft from the second pair of high pressure pistons.
Figure 2B:
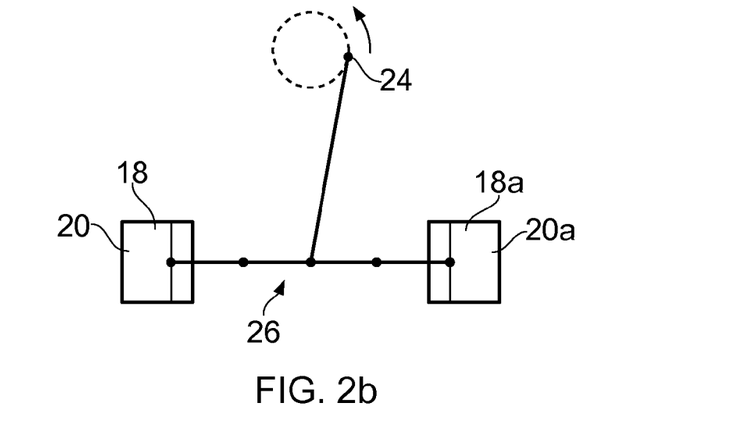

Crankshaft 4 of FIG. 1 carries a crank indicated at 24 in FIG. 2a which is driven by pistons 18 and 18a via connecting rod 25 and the toggle arrangement 26 comprising arms or toggle links 27 and 27a for the respective pistons which are pivoted together and to the small end of the connecting rod at 28. The outer ends of the toggle are pivoted to piston rods 30 and 30a at points 29 and 29a. It is assumed that the pivot point 28 is constrained to only move vertically and pivot points 29 and 29a to move substantially only horizontally. In FIG. 2a pistons 18 and 18a are in their bottom dead centre position i.e. the volume of the working spaces 20 and 20a of the engine are at a maximum and the toggle 26 is fully knuckled or toggled in the direction away from the crankshaft. FIG. 2b shows the crankshaft advanced by 90 degrees. The toggle 26 is straight or extended and pistons 18 and 18a are in the top dead centre position i.e. the working spaces 20 and 20a are at a minimum.

Figure 2C:
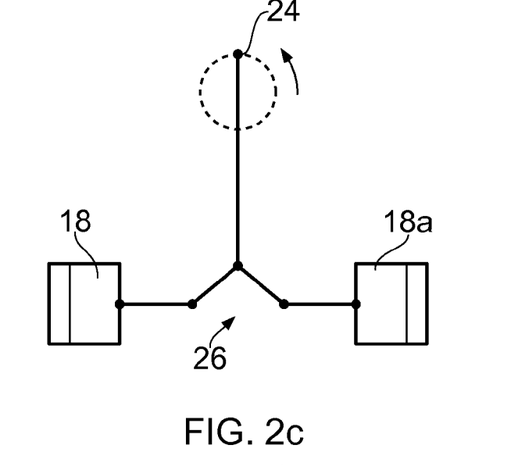
Figure 2D:
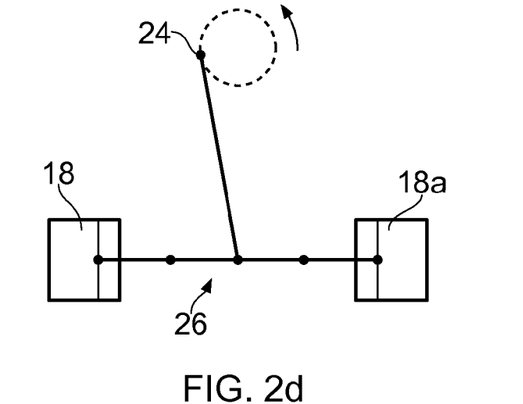

When the crankshaft moves to the 180 degree position as shown in FIG. 2c the toggle is fully knuckled in the direction towards the crankshaft but otherwise the situation is identical to FIG. 2a with pistons 18 and 18a at bottom dead centre. In the 270 degree position shown in FIG. 2d the toggle is again straight and pistons 18 and 18a are once more at top dead centre. Thus in one revolution of the crankshaft pistons 18 and 18a perform four complete strokes and the required frequency doubling has been effected.

Figure 3A:
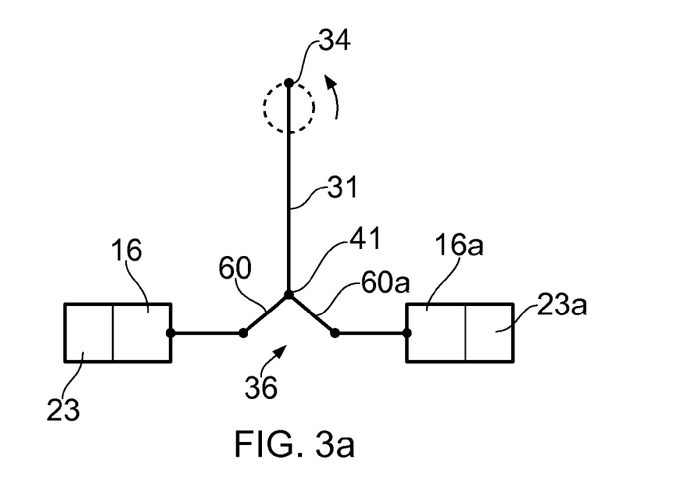
Figure 3B:
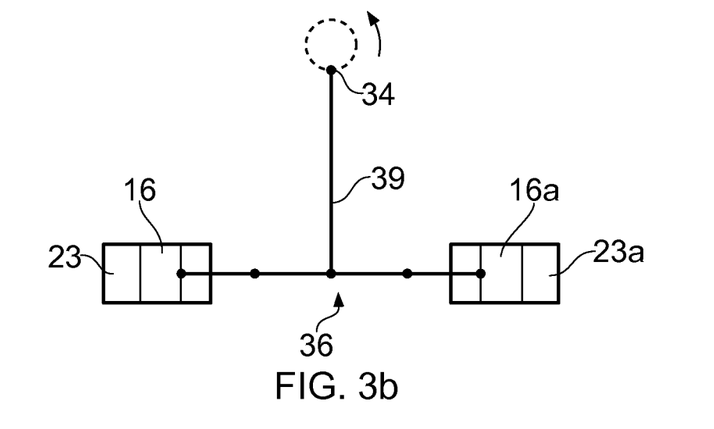

Considering now the first pair of high pressure cylinders illustrated in FIGS. 3a and 3b. In this example pistons 16 and 16a drive the crankpin 34 through the toggle arrangement 36 comprising toggle links 60 and 60a pivoted together to the small end of the connecting rod 37 at pivot point 41. Toggle arrangement 36 is of similar proportions to that of FIG. 2a. However the eccentricity of the crank 34 is half that of crank 24 of FIG. 2 which drives the low pressure system. Hence in the initial position of crank 34 toggle 36 is fully knuckled or toggled and pistons 16 and 16a are at bottom dead centre i.e. spaces 23 and 23a are at a maximum. Rotation of crank 34 through 180 degrees results in toggle 36 being straight or extended and pistons 16 and 16a at top dead centre i.e. spaces 23 and 23a are at a minimum as shown in FIG. 3b. Thus the pistons perform two strokes for one revolution of the crankshaft.

Figure 4A:
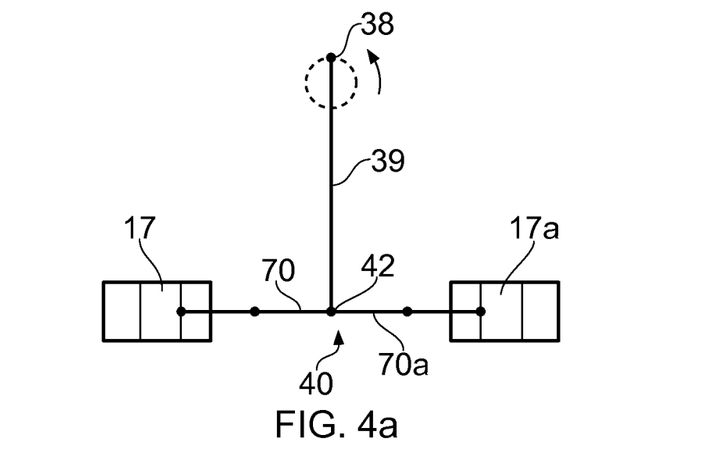
Figure 4B:
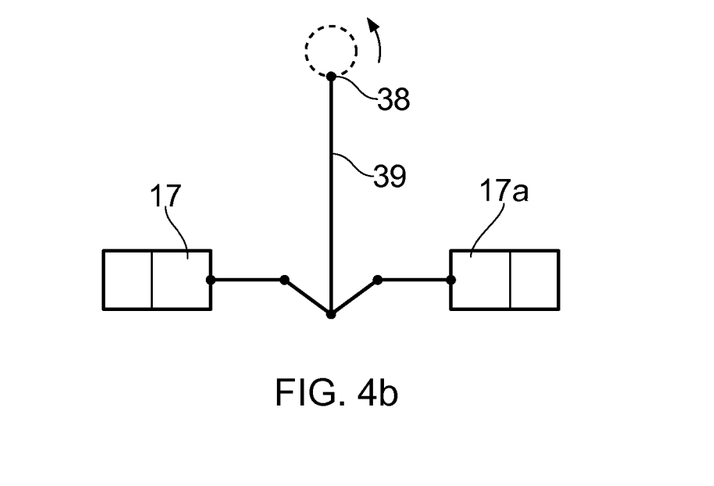

The second pair of high pressure cylinders are shown in FIGS. 4a and 4b. In this example pistons 17 and 17a drive the crankpin 38 through the toggle arrangement 40 comprising toggle links 70 and 70a pivoted together to the small end of the connecting rod 39 at pivot point 42. The pistons in these cylinders are required to be in antiphase to the pistons of the first pair of high pressure cylinders. This is achieved by increasing the length of connecting rod 39 of FIG. 4 by twice the radius of crank 34 compared with the length of connecting rod 37 of FIG. 3. Otherwise the linkage of FIG. 4 is identical to that of FIG. 3. In particular crank 38 has the same eccentricity and phase as crank 34 of FIG. 3.

The motion of the low pressure pistons does not depart greatly from sinusoidal but in the case of the high pressure pistons the motion is highly distorted since the pistons dwell at that end of the stroke when the toggle is straight. This is advantageous if we arrange that when the toggle is straight the high pressure pistons are at bottom dead centre. In this case when the low pressure piston is at top dead centre and the transfer valves are operated the high pressure pistons have completed approximately 70% of their stroke from top dead centre i.e. are 30% from bottom dead centre. Thus more of the expansion stroke takes place in the high pressure cylinders improving the torque characteristics of the engine, reducing pressures in the low pressure cylinders, which can therefore be more lightly constructed, and reducing the temperature of the gases passing through the transfer valve. Similarly during compression more work is done by the high pressure cylinders.

Figure 5:
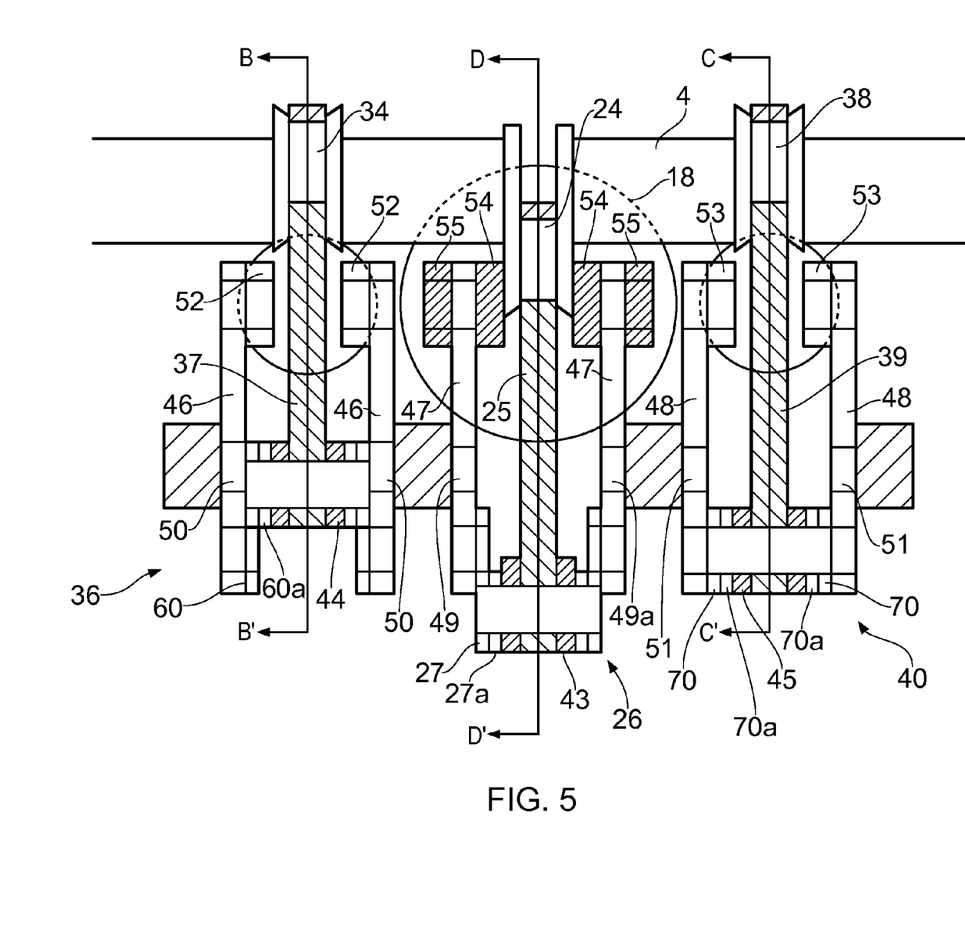
FIG. 5 is a section through the engine on the axis of the crankshaft.
Figure 6:
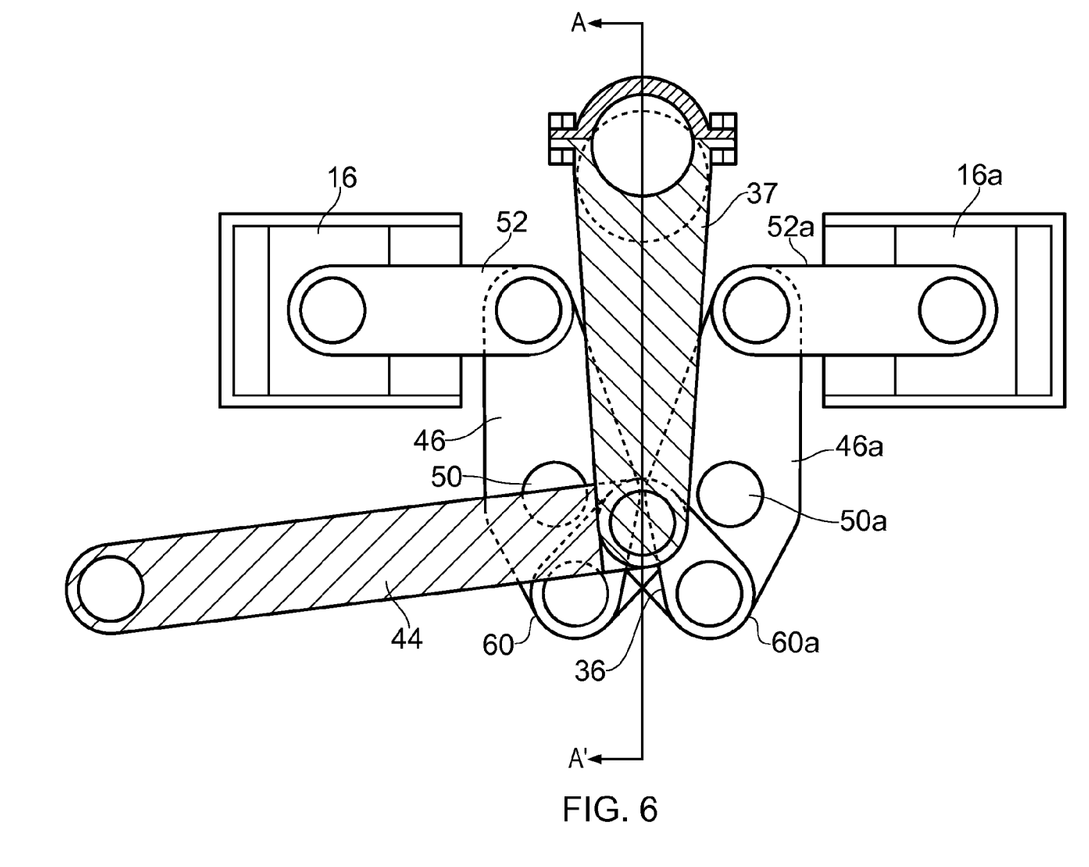
FIG. 6 is a section through one pair of high pressure cylinders on the line B-B' of FIG. 5.
Figure 7:
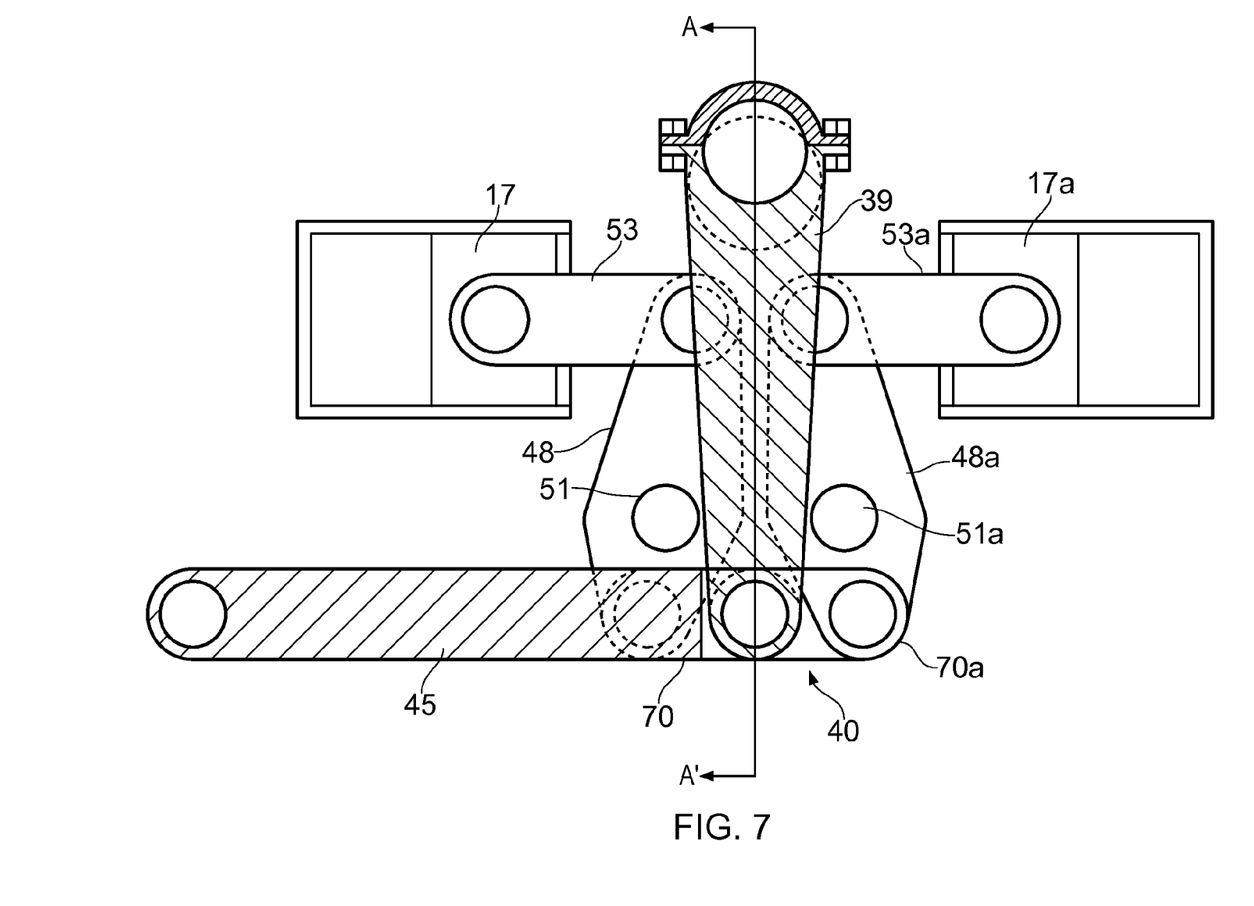
FIG. 7 is a section through the second pair of high pressure cylinders on the line C-C' of FIG. 5.
Figure 8:
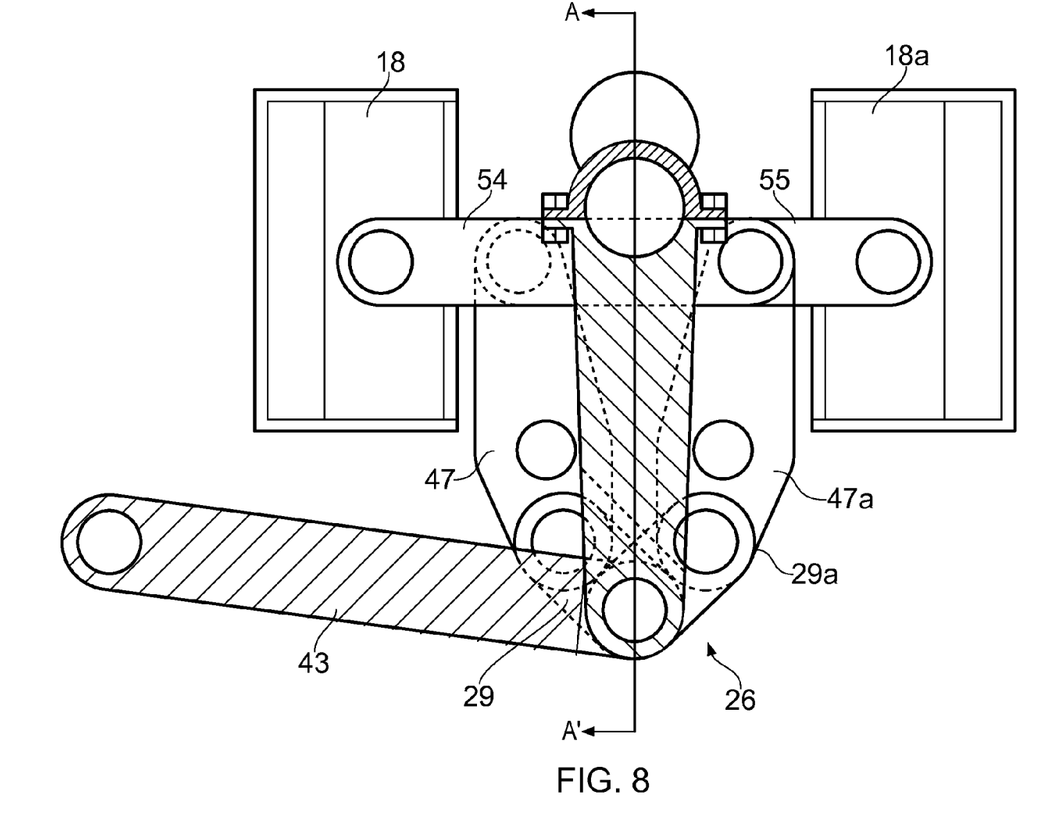
FIG. 8 is a section through the pair of low pressure cylinders on the line D-D' of FIG. 5.

Constructional features of the engine will now be described with reference to FIGS. 5-8. FIGS. 6-8 show cross sections BB', CC' and DD' taken through the engine as indicated in FIG. 5. The numbering of the components in these figures is, where appropriate, the same as in the diagrammatic FIGS. 1-4. The arrangement of the toggles and associated levers has been modified to reduce the space occupied by the lever system. For compactness it is desirable to reduce the crankshaft throw by a factor of two relative to the piston stroke. This is achieved by a two to one ratio in levers 46, 46a, 47,47a, and 48,48a. With reference to FIG. 5 crankshaft 4 carries three cranks 34, 24 and 38. Crank 24 is connected to the mechanism driven by the low pressure pistons 18 and 18a and has twice the eccentricity of cranks 34 and 38 which are driven by pistons 16 and 16a and 23 and 23a respectively. The main bearings of crankshaft 4 have for reasons of clarity not been shown. Connecting rods 25, 37 and 39 connect cranks 24, 34 and 38 to their respective toggles 26, 36 and 40 which are duplicated on either side of each connecting rod for purposes of symmetry. The centre point of each toggle 28, 41 and 42 is constrained to move only in a substantially vertical direction by the swinging arms 43, 44 and 45 which can be more clearly seen in FIGS. 6, 7 and 8 and which are pivoted at their outer ends to the frame of the engine. The outer ends of toggles 26, 36 and 40 are pivoted to the lower ends of levers 47 and 47a, 46 and 46a and 48 and 48a respectively. As in the case of the toggles these levers are duplicated on either side of each connecting rod and are carried on shafts 49 and 49a, 50 and 50a and 51 and 51a which are fixed to the frame of the engine.

The upper ends of levers 46 and 46a, 47 and 47a are pivoted to piston rods 52 and 52a and 53 and 53a respectively as shown in FIGS. 6 and 7. The outer ends of piston rods 52 and 52a are attached to pistons 16 and 16a and the outer ends of piston rods 53 and 53a are attached to pistons 54 and 54a. In the case of the low pressure pistons it is arranged that the left hand lever is driven by the right hand piston and vice versa. This is desirable since the arrangement of levers to transmit the piston motion to the crankshaft involves a reversal of phase compared to the phase relationship of FIG. 2. Referring to FIGS. 5 and 8 piston rods 55 are located on the outside of lever arms 47 but are driven by piston 18a and lever arms 47a carry piston rods 54 on their inside face and are driven by piston 18.

For larger engines a plurality of basic engines may be connected together so that torque variations are further reduced. Alternatively a single engine unit may comprise only one low pressure cylinder and two high pressure cylinders.

The skilled person will appreciate that the above-described engine is only one possible embodiment of the invention and that various modifications are possible, and that similar piston arrangements to those described in relation to the engine may be used in other applications, for example in pumps.

The invention claimed is:

1. An engine comprising:
   at least two high pressure pistons movable within respective high pressure cylinders and at least one low pressure piston movable within a low pressure cylinder;
   a first linkage mechanism coupling the low pressure piston to a crankshaft includes a first toggle link, and a second linkage mechanism coupling at least one of the high pressure pistons to the crankshaft includes a second toggle link;
   wherein the first toggle link is adapted to move from a straight position in a first direction towards the crankshaft to a first knuckled position and then to move through the straight position in a second direction opposite the first direction to a second knuckled position and back to the straight position for every one revolution of the crankshaft, the straight position of the first toggle link corresponds to a top dead centre position of the low pressure piston within the low pressure cylinder;
   wherein the second toggle link is adapted to move from a straight position to a knuckled position and back to the straight position for every one revolution of the crankshaft, the straight position of the second toggle link corresponds to a top dead centre position of the high pressure piston within the high pressure cylinder; and
   wherein the low pressure piston moves through twice the number of strokes moved through by each of the high pressure pistons in the same period of time.

2. An engine according to claim 1, wherein the first toggle link is pivotally connected to the low pressure piston and pivotally connected to a first connecting rod.

3. An engine according to claim 1, comprising at least four high pressure pistons and at least two low pressure pistons.

4. An engine according to claim 3, wherein the first linkage mechanism couples the two low pressure pistons to the crankshaft by respective first toggle links.

5. An engine according to claim 3, further comprising at least two second linkage mechanisms, each second linkage mechanism coupling one pair of the high pressure pistons to the crankshaft by the second toggle links.

6. An engine according to claim 5, wherein the second toggle links of each second linkage mechanism are pivotally connected to respective second and third connecting rods.

7. An engine according to claim 6, wherein the second and third connecting rods have different lengths such that the pairs of high pressure pistons operate 180 degrees out of phase with each other.

8. An engine according to claim 7, wherein one of the second and third connecting rods differs in length from the other by approximately twice the radius of the cranks at the points of connection to the second and third connecting rods.

9. An engine according to claim 6 wherein the first toggle link is pivotally connected to the low pressure piston and pivotally connected to a first connecting rod, and wherein the first, second and third connecting rods are coupled to respective first, second and third crank-pins of the crankshaft having axes which are substantially in the same plane.

10. An engine according claim 9, wherein the first crank pin is located on an opposite side of the crankshaft to the second and third crank pins.

11. An engine according claim 9, wherein the first crank pin has approximately twice the eccentricity of the second and third crank pins.

12. An engine according to claim 3, comprising first, second, third and fourth high pressure cylinders, and first and second low pressure cylinders, wherein the third and fourth high pressure cylinders and second low pressure cylinder are arranged on the opposite side of the crankshaft to the first and second high pressure cylinders and the first low pressure cylinder.

13. An engine according to claim 12, wherein the third and fourth high pressure cylinders oppose the first and second high pressure cylinders, and the second low pressure cylinder opposes the first low pressure cylinder.

14. An engine comprising a plurality of units as described in claim 1 integrated together to form a larger engine.

* * * * *